US012022577B2

(12) United States Patent
Rossoll et al.

(10) Patent No.: US 12,022,577 B2
(45) Date of Patent: Jun. 25, 2024

(54) HEATING COMPONENT IN AEROSOL GENERATING DEVICES

(71) Applicant: PHILIP MORRIS PRODUCTS S.A., Neuchâtel (CH)

(72) Inventors: Andreas Michael Rossoll, Le Mont-sur-Lausanne (CH); Oleg Fursa, Gempenach (CH); Enrico Stura, Palézieux-Village (CH); Jerome Christian Courbat, Neuchâtel (CH); Oleg Mironov, Cudrefin (CH); Rui Nuno Batista, Morges (CH)

(73) Assignee: Philip Morris Products, S.A., Neuchâtel (CH)

( * ) Notice: Subject to any disclaimer, the term of this patent is extended or adjusted under 35 U.S.C. 154(b) by 0 days.

(21) Appl. No.: 17/867,459

(22) Filed: Jul. 18, 2022

(65) Prior Publication Data

US 2022/0353958 A1 Nov. 3, 2022

Related U.S. Application Data

(63) Continuation of application No. 16/611,412, filed as application No. PCT/IB2018/053859 on May 30, 2018, now Pat. No. 11,452,180.

(30) Foreign Application Priority Data

May 31, 2017 (EP) .................................... 17173829

(51) Int. Cl.
*A24F 13/00* (2006.01)
*A24F 40/465* (2020.01)
(Continued)

(52) U.S. Cl.
CPC ........... *H05B 6/105* (2013.01); *A24F 40/465* (2020.01); *A24F 40/53* (2020.01); *A24F 40/57* (2020.01); *H05B 6/10* (2013.01); *A24F 40/20* (2020.01)

(58) Field of Classification Search
CPC ...................................................... A24F 47/00
(Continued)

(56) References Cited

U.S. PATENT DOCUMENTS 8,528,569 B1 9/2013 Newton
10,051,890 B2 8/2018 Mironov et al.
(Continued)

FOREIGN PATENT DOCUMENTS

CN 104664608 6/2015
CN 204949521 U 1/2016
(Continued)

OTHER PUBLICATIONS

Japanese Office Action for JP Application No. 2019-559324, issued by the Japanese Patent Office, Jun. 20, 2022; 9 pgs. including English translation.
(Continued)

*Primary Examiner* — Phuong K Dinh
(74) *Attorney, Agent, or Firm* — Mueting Raasch Group

(57) ABSTRACT

An electronic aerosol-generating device includes a housing extending between first and second ends along a longitudinal axis. The second end of the housing defines a cavity for receiving a consumable containing an aerosol generating substrate. The device further includes a heating component comprising a heating element extending along the longitudinal axis within the cavity and configured to penetrate into the aerosol generating substrate when the consumable is inserted into the cavity. The heating element comprises a material having a Curie temperature of less than 500° C. The
(Continued)

device also includes an inductor comprising an inductor coil positioned to transfer magnetic energy to the heating element. The inductor is configured to induce eddy currents and/or hysteresis losses in the heating element. The device further includes a power supply operably connected to the inductor and control electronics operably connected to the power supply and configured to control heating of the heating element.

18 Claims, 3 Drawing Sheets

(51) Int. Cl.

| | |
|---|---|
| ***A24F 40/53*** | (2020.01) |
| ***A24F 40/57*** | (2020.01) |
| ***H05B 6/10*** | (2006.01) |
| *A24F 40/20* | (2020.01) |

(58) Field of Classification Search
USPC .................................................. 131/328–329
See application file for complete search history.

(56) References Cited

U.S. PATENT DOCUMENTS

| | | | | |
|---|---|---|---|---|
| 10,117,460 | B2 | 11/2018 | Sears et al. | |
| 10,130,121 | B2 | 11/2018 | Plojoux et al. | |
| 10,159,283 | B2 | 12/2018 | Mironov | |
| 10,617,149 | B2 | 4/2020 | Malgat et al. | |
| 11,452,180 | B2 * | 9/2022 | Rossoll | A24F 40/57 |
| 2017/0055580 | A1 | 3/2017 | Blandino et al. | |
| 2017/0055583 | A1 * | 3/2017 | Blandino | A24F 40/465 |
| 2017/0119047 | A1 | 5/2017 | Blandino et al. | |
| 2018/0042306 | A1 * | 2/2018 | Atkins | A61M 11/042 |
| 2020/0163384 | A1 | 5/2020 | Rossoll | |

FOREIGN PATENT DOCUMENTS

| | | | |
|---|---|---|---|
| CN | 105722416 | | 6/2016 |
| CN | 106455714 | | 2/2017 |
| EP | 2444122 | | 4/2012 |
| EP | 2967155 | A1 | 1/2016 |
| JP | 2012529936 | | 11/2012 |
| JP | 2020505077 | | 2/2020 |
| RU | 2600092 | C2 | 10/2016 |
| WO | 20130083631 | | 6/2013 |
| WO | 20140102092 | | 7/2014 |
| WO | 20150177046 | | 11/2015 |
| WO | 20150177252 | | 11/2015 |
| WO | 20150177254 | | 11/2015 |
| WO | 20150177255 | | 11/2015 |
| WO | 20150177263 | | 11/2015 |
| WO | 20150177294 | | 11/2015 |
| WO | 20160120177 | | 8/2016 |
| WO | 20160124550 | | 8/2016 |
| WO | 20160184929 | | 11/2016 |
| WO | 20180146071 | | 8/2018 |

OTHER PUBLICATIONS

Chinese Office Action for CN Application No. 201880029988.0, issued by the Chinese Patent Office, Jul. 14, 2022; 19 pgs. including English translation.
Extended European Search Report issued by the European Patent Office for EP Application No. 17173829.7; Jan. 18, 2018; 9 pgs.
International Search Report and Written Opinion, issued by the European Patent Office for PCT/IB2018/053859; Sep. 20, 2018; 17 pgs.
International Preliminary Report on Patentabilty, issued by the European Patent Office for PCT/IB2018/053859; Aug. 2, 2018; 9 pgs.
Russian Office Action and Search Report for RU2019135673 issued by the Patent Office of the Russian Federation dated Sep. 7, 2021; 16 pgs. including Engl. Translation.

* cited by examiner

HEATING COMPONENT IN AEROSOL GENERATING DEVICES

This is a continuation application of U.S. patent application Ser. No. 16/611,412, filed Nov. 6, 2019, which is a § 371 U.S. National Stage of International Application No. PCT/IB2018/053859, filed 30 May 2018, which claims the benefit of European Application No. 17173829.7, filed 31 May 2017, the disclosure of which are incorporated herein by reference.

FIELD

This disclosure relates to an aerosol generating device including a susceptor that is inserted into an aerosol generating substrate of a consumable in order to internally heat the aerosol generating substrate for generating an inhalable aerosol.

INTRODUCTION

Electronic aerosol generating devices are typically configured to receive a consumable comprising an aerosol generating substrate. After use of the consumable or depletion of the aerosol generating substrate, the consumable may be removed from the device and replaced with a fresh consumable. The consumables may be, for example, heat sticks containing wrappers that circumscribe a tobacco rod, cartridges containing a liquid source of nicotine, or cartridges containing dry powder nicotine.

Regardless of the type of consumable or aerosol generating device, the aerosol generating substrate may be heated to release volatile flavour compounds, without combustion of the aerosol generating substrate. The released volatile compounds may then be conveyed within an aerosol to the user. In use, volatile compounds are released from the aerosol-forming substrate by heat transfer from a heat source and are entrained in air drawn through the aerosol generating device. As the released compounds cool, they condense to form an aerosol that is inhaled by the user.

A number of prior art documents disclose aerosol generating devices for consuming heated aerosol generating substrates. Such devices include, for example, electrically heated aerosol generating devices in which an aerosol is generated by the transfer of heat from one or more electrical heating elements of the aerosol generating device to the aerosol generating substrate received by the aerosol generating article. One advantage of such electrical smoking systems is that they may reduce sidestream smoke and may permit a user to selectively suspend and reinitiate use of the device and substrate.

An example of an aerosol generating device including an inductive heating element is disclosed in U.S. Patent Application Publication No. US2017/0055580. The inductive heating element is attached to a body of the aerosol generating device and surrounded by a magnetic field generator including coils. Additionally, the aerosol generating device includes a temperature sensor for sensing the temperature of the heating zone proximate the aerosol generating substrate. For example, the temperature sensor may take an optical temperature measurement and send a signal to the controller so that the current through the coils may be adjusted to achieve a desired temperature.

The addition of a temperature sensor as a separate component that takes temperature measurements and sends signals to the controller adds complexity to the device. It may be desirable to control the operating temperature without requiring an additional temperature sensor and associated components.

An example of an aerosol generating substrate including an internal heating element with temperature control is disclosed in PCT Patent Application Publication No. WO 2015/177294. The internal heating element is inserted into the aerosol generating substrate such that the internal heating element is in direct contact with the aerosol generating substrate. For example, the aerosol generating substrate may be surrounding the internal heating element. Direct contact between an internal heating element of an aerosol-generating device and the aerosol-forming substrate of an aerosol-generating article can provide an efficient means for heating the aerosol-forming substrate to form an inhalable aerosol.

Thus, aerosol-delivery systems that comprise an aerosol-forming substrate and an inductive heating device are known or have been described. The inductive heating device comprises an induction source, which produces an alternating electromagnetic field that induces a heat generating eddy current and/or hysteresis losses in a susceptor material. The susceptor material is in thermal proximity of the aerosol generating substrate. The heated susceptor material in turn heats the aerosol generating substrate, which comprises a material, which is capable of releasing volatile compounds that can form an aerosol.

Inductive heating of the aerosol-forming substrate using a susceptor may be a form of “contactless heating”. For example, inductive heating elements (also referred to as susceptors throughout this specification) are typically positioned within the consumable in contact with the aerosol generating substrate. Because the inductive heating element does not need to be electrically coupled to a power source, the inductive heating element may be surrounded by the aerosol generating substrate of the consumable without direct connection to the device. As a result, the consumable may be manufactured to include the inductive heating element therein. However, incorporation of an inductive heating element into each consumable may result in more complex and expensive manufacturing and may result in additional waste because the inductive heat element would be disposed of along with the consumable after each use.

In situations where the susceptor is included in the consumable, there is no direct means to measure the temperature inside the consumable’s aerosol-forming substrate itself because there is no contact between the device and the inside of the consumable in which the aerosol-forming substrate is disposed. In such cases, the operating temperature may be controlled by selecting a material of the susceptor to have a specific Curie temperature.

Alternatively the inductive heating element may be permanently attached to the aerosol generating device (for examples as described in US 2017/0055580). In some instances, a permanently attached inductive heating element may include a heating blade configured to penetrate into the aerosol generating substrate when the consumable is inserted into the aerosol generating device. Unfortunately, heating blades may be fragile and may break or become damaged during multiple rounds of insertion and removal of consumables from the aerosol generating device. In addition, the heating blade may become dirty over time as, for example, portions of the consumable may stick to the blade, requiring manual cleaning of the blade. Manual cleaning of the heating blade may be tedious or may result in damage to the fragile blades.

SUMMARY

One object of the present invention is to manufacture an aerosol-generating device that includes a heating element that may be inserted into the aerosol generating substrate of a consumable when the consumable is inserted into the device and that may control the temperature of the heating element without use of a separate temperature sensor. Another object of the present invention is to manufacture an aerosol-generating device to which a heating component (e.g., including a heating blade) may be attached and removed without damaging the heating component or the device. Other objects of the present invention will be evident to those of skill in the art upon reading and understanding the present disclosure, which includes the claims that follow and the accompanying drawings.

In an aspect of the present invention, an electronic aerosol generating device for receiving a consumable comprising an aerosol generating substrate may include a housing, a heating component, an inductor, a power supply, and control electronics. The housing extends between a first end and a second end along a longitudinal axis. The housing defines a cavity proximate the second end for receiving the consumable. The heating component may be removably attachable within the cavity of the housing. The heating component comprises an elongated heating element extending along the longitudinal axis when the heating component is attached to the housing. The heating element is configured to penetrate into the aerosol generating substrate when the consumable is at least in part inserted into the cavity. In a preferred embodiment the elongated heating element is in the shape of a blade.

In some aspects, the electronic device includes a first portion and a second portion. The first and second portions are removably attachable to each other. The first portion comprises the inductor (e.g., to generate an alternating magnetic field that in turn induces eddy currents and/or hysteresis losses in the heating element) and a portion of the housing defining the cavity and the second portion includes the heating component. The power supply and the control electronics may be located in either one of the first or second portions.

In an aspect of the present invention, the heating blade includes a first material and a second material, the first material being disposed in intimate physical contact with the second material. The first material preferably has a Curie temperature that is lower than 500° C. The second material is preferably used primarily to heat the heating element when the heating element is placed in a fluctuating electromagnetic field. Any suitable material may be used. The first material is preferably used primarily to indicate when the heating element has reached a specific temperature, that temperature being the Curie temperature of the first material. The Curie temperature of the first material can be used to regulate the temperature of the entire heating element during operation. Thus, the Curie temperature of the first material is preferably below the ignition point of the aerosol generating substrate to allow aerosol to be generated from the substrate without combustion of the substrate.

One or more aspects of the electronic aerosol generating devices of the present invention provide one or more advantages over currently available electronic aerosol generating devices. For example, one advantage of some aspects of the present invention relate to reduced complexity of the temperature control. The heating element may include materials that allow the device to monitor the heating element temperature such that a separate temperature sensor is not necessary. Such temperature control of the heating element reduces, size, cost and complexity of the device relative to devices including a separate temperature sensor and associated components.

By way of further example and in accordance with some aspects of the invention, the heating elements may readily be removed and reattached or replaced to facilitate or avoid cleaning of the elements. In addition, the blades may be replaced when damaged. Accordingly, and in contrast to aerosol generating devices that contain permanently attached heating elements, the devices of the present invention may continue to be used rather than discarded when a heating element breaks. Furthermore, attaching an inductive heating element to the aerosol generating device allows the inductive heating element to be utilized with multiple consumables, in contrast to when inductive heating elements are incorporated into the consumable. In addition, manufacturing complexity and cost of the consumable may be reduced if the inductive heating element is not incorporated in the consumable.

DETAILED DESCRIPTION

The present invention may be applicable to any suitable aerosol-generating electronic device. As used herein, an "electronic device" is a device that has one or more electrical components. At least some of the one or more electrical components control generation or delivery of an aerosol from an aerosol generating substrate to a user. The electrical components may include the heating element of the heating component, which may include, for example, one or more inductive elements. The electrical components may also control heating of the elongated heating element. Preferably, the control electronics control heating of the heating element such that the heating element heats an aerosol generating substrate to an extent sufficient to generate an aerosol from the substrate but to avoid combustion of the substrate.

Control electronics may be provided in any suitable form and may, for example, include a controller and a memory. The controller may include one or more of an Application Specific Integrated Circuit (ASIC) state machine, a digital signal processor, a gate array, a microprocessor, or equivalent discrete or integrated logic circuitry. Control electronics may include memory that contains instructions that cause one or more components of the control electronics to carry out a function or aspect of the control electronics. Functions attributable to control electronics in this disclosure may be embodied as one or more of software, firmware, and hardware.

Any suitable consumable comprising an aerosol generating substrate may be used with aerosol generating devices of the present invention. The aerosol-generating substrate is preferably a substrate capable of releasing volatile compounds that can form an aerosol. The volatile compounds are released by heating the aerosol-generating substrate. The aerosol-generating substrate may be solid or liquid or comprise both solid and liquid components. Preferably, the aerosol-generating substrate is solid.

In preferred embodiments the consumable comprises an aerosol-generating substrate assembled within a wrapper in the form of a rod having a mouth end and a distal end upstream from the mouth end. The aerosol generating substrate is located at or towards the distal end of the rod.

The aerosol-generating substrate preferably comprises nicotine. The nicotine containing aerosol-generating substrate may comprise a nicotine salt matrix.

The aerosol-generating substrate may comprise plant-based material. The aerosol-generating substrate preferably comprises tobacco. The tobacco containing material contains volatile tobacco flavor compounds, which are released from the aerosol-generating substrate upon heating.

The aerosol-generating substrate may comprise homogenized tobacco material. Homogenized tobacco material may be formed by agglomerating particulate tobacco. Where present, the homogenized tobacco material may have an aerosol-former content of equal to or greater than 5% on a dry weight basis, and preferably between greater than 5% and 30% by weight on a dry weight basis.

The aerosol-generating substrate may alternatively or additionally comprise a non-tobacco-containing material. The aerosol-generating substrate may comprise homogenized plant-based material.

The aerosol-generating substrate may comprise, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco.

The aerosol-generating substrate may comprise at least one aerosol-former. The aerosol-former may be any suitable known compound or mixture of compounds that, in use, facilitates formation of a dense and stable aerosol and that is substantially resistant to thermal degradation at the operating temperature of the aerosol-generating device. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerine. The aerosol-forming substrate may comprise other additives and ingredients, such as flavorants. The aerosol-generating substrate preferably comprises nicotine and at least one aerosol-former. In a particularly preferred embodiment, the aerosol-former is glycerine.

Preferably, the aerosol-generating substrate comprises about 40% water by weight or less, such as about 30% or less, about 25% or less or about 20% or less. For example, the aerosol-generating substrate may comprise 5% to about 30% water by weight.

Preferably, the aerosol-generating substrate is in solid form rather that in a fluid form. Preferably the solid aerosol-generating substrate holds its shape. The solid aerosol-generating substrate may be in loose form, or may be provided in a suitable consumable such as container or cartridge.

Preferably, the consumable is in the form of a heat stick in which the aerosol-generating substrate, preferably comprising tobacco, is circumscribed by a paper wrapper. Examples of heat sticks include Marlboro IQOS HeatSticks (known in some markets under the trademark name "HEATS") that may be used with an IQOS heating system.

The consumable may comprise a thermally stable carrier. The solid aerosol-forming substrate may be provided on or embedded in the thermally stable carrier. In a preferred embodiment, the carrier is a tubular carrier having a thin layer of the solid substrate deposited on its inner surface, or on its outer surface, or on both its inner and outer surfaces. Such a tubular carrier may be formed of, for example, a paper, or paper like material, a non-woven carbon fiber mat, a low mass open mesh metallic screen, or a perforated metallic foil or any other thermally stable polymer matrix. Alternatively, the carrier may take the form of powder, granules, pellets, shreds, spaghettis, strips or sheets.

The carrier may be a non-woven fabric or fiber bundle into which tobacco components have been incorporated. The non-woven fabric or fiber bundle may comprise, for example, carbon fibers, natural cellulose fibers, or cellulose derivative fibers.

In an embodiment, the consumable comprises a tubular substrate having a cavity for receiving the heating element in the form of a blade. The heating blade may, thus, penetrate into the aerosol-generating substrate.

The electronic aerosol-generating device of the present invention is configured to receive the consumable and to heat the aerosol generating substrate of the consumable when the consumable is received by the device. The device may comprise a housing that extends between a first end and a second end along a longitudinal axis. The second end of the housing defines a cavity configured to, at least in part, receive the consumable.

The electronic aerosol generating device may also include a heating component comprising a heating element (e.g. a blade) extending along the longitudinal axis within the cavity of the housing. The heating element is configured to penetrate into the aerosol generating substrate of a consumable when the consumable is received in the cavity such that the heating element may heat the aerosol generating substrate to produce an aerosol. The heating element may extend between a base end and a front end defining a tapered edge. The tapered edge of the front end of the heating element may be configured to penetrate into the aerosol generating substrate. The heating component may be removably attachable from the device or may form a permanent portion of the device.

In example where the heating component is removably attachable from the device, the housing may have a receiving portion configured to receive the heating component therein. The receiving portion may be any suitable portion or formation of the housing that may receive the heating component therein. For example, the receiving portion may be a recess or aperture in the housing that may be sized and/or configured to receive the heating component. The receiving portion may be positioned at any suitable location on the housing. For example, the receiving portion may be proximate or near the second end of the housing or the first end of the housing.

For purposes of the present disclosure, a heating component that is removably attachable to a housing is a heating component that may be removed from the housing and reattached to the housing without damaging any portion of the heating component or the housing. In some aspects of this invention, a second heating component (e.g., a different heating component, which may be a replacement heating component) may be attached to the housing after the initial heating component is removed from the housing. Specifically, the heating component may be removably attached within the receiving portion of the housing. In other words, the heating component may be received by the receiving portion of the housing. In some aspects, as described further herein, the heating component may be configured to engage with the receiving portion of the housing such that the heating component is at least selectively restricted from moving relative to the housing.

The heating element comprises an inductive heating element (also referred to as a susceptor) that may be heated by application of an alternating magnetic field, which may be produced by an inductor coil of an inductor. The inductive heating element has the ability to convert energy transferred as magnetic waves into heat. This is because the alternating magnetic field will induce eddy currents and/or hysteresis losses in the heating element, which thereby will be heated by joule heating and/or hysteresis losses. Hysteresis losses is to be understood as heat generated during magnetic domain block fluctuations that may be induced by the alternating magnetic field. A susceptor heated this way will then transfer heat to the aerosol generating substrate of the consumable (primarily by conduction of heat).

Preferably, the inductive heating element is not in direct physical contact with the control electronics because the inductive coil induces heat within the inductive heating element without direct electrical connection to the inductive heating element. For example, the inductor coil may be positioned around the inductive heating element (e.g., within the cavity of the housing described below) and provided with a high frequency alternating current (AC) to produce an alternating magnetic field. While the inductive heating element may not be directly connected to the control electronics, the inductor coil may be operably coupled to the control electronics. Because the inductive heating element does not need to be physically contacting the control electronics, a heating component that includes an inductive heating element may not need to provide a robust electrical connection between the housing/control electronics and the inductive heating element.

The heating element may comprise a first material and a second material, the first material being disposed in intimate physical contact with the second material. The first material preferably has a Curie temperature that is lower than 500° C. The second material is preferably used primarily to heat the heating element when the heating element is placed in a fluctuating electromagnetic field. Any suitable material may be used. For example the second material may be aluminium, or may be a ferrous material such as a stainless steel. The first material is preferably used primarily to indicate when the heating element has reached a specific temperature, that temperature being the Curie temperature of the first material. The Curie temperature of the first material can be used to regulate the temperature of the entire heating element during operation. Thus, the Curie temperature of the first material is preferably below the ignition point of the aerosol generating substrate. Suitable materials for the first material may include nickel and certain nickel alloys.

Preferably, the heating component may include a first material having a first Curie temperature and a second material having a second Curie temperature, the first material being disposed in intimate physical contact with the second material. The first Curie temperature is preferably lower than the second Curie temperature. As used herein, the term 'first Curie temperature' refers to the Curie temperature of the first material.

By providing a heating element having at least a first and a second material, with either the first material having a Curie temperature and the second material not having a Curie temperature, or first and second materials having first and second Curie temperatures distinct from one another, the heating of the aerosol generating substrate and the temperature control of the heating may be separated. While the second material may be optimized for heat loss and thus heating efficiency, the first material may be optimized for temperature control. The first material need not have any pronounced heating characteristic. The first material may be selected to have a Curie temperature, or first Curie temperature, which corresponds to a predefined maximum desired heating temperature of the second material. The maximum desired heating temperature may be defined such that a local overheating or burning of the aerosol generating substrate is avoided. The heating element comprising the first and second materials has a unitary structure and may be termed a bi-material heating element or a multi-material heating element. The immediate proximity of the first and second materials may be of advantage in providing an accurate temperature control.

The second material is preferably a magnetic material having a Curie temperature that is above 500° C. It is desirable from the point of view of heating efficiency that the Curie temperature of the second material is above any maximum temperature that the heating component should be capable of being heated to. The first Curie temperature may preferably be selected to be lower than 500° C., lower than 400° C., preferably lower than 380° C., or lower than 360° C. It is preferable that the first material is a magnetic material selected to have a first Curie temperature that is substantially the same as a desired maximum heating temperature. That is, it is preferable that the first Curie temperature is approximately the same as the temperature that the heating element should be heated to in order to generate an aerosol from the aerosol generating substrate. The first Curie temperature may be within the range of 200° C. to 500° C., or between 250° C. and 360° C.

In one embodiment, the first Curie temperature of the first material is selected such that, upon being heated at a temperature equal to the first Curie temperature, an overall average temperature of the aerosol generating substrate does not exceed 240° C. The overall average temperature of the aerosol generating substrate here is defined as the arithmetic mean of a number of temperature measurements in central regions and in peripheral regions of the aerosol generating substrate. By pre-defining a maximum for the overall average temperature the aerosol generating substrate may be tailored to an optimum production of aerosol.

The second material is preferably selected for maximum heating efficiency. Inductive heating of a magnetic material located in a fluctuating magnetic field occurs by a combination of resistive heating due to eddy currents induced in the heating blade, and heat generated by magnetic hysteresis losses. Preferably the second material is a ferromagnetic metal having a Curie temperature in excess of 400 or 500° C. Preferably the second is iron or an iron alloy, such as a steel or an iron nickel alloy. It may be particularly preferred that the second material is a 400 series stainless steel such as grade 410 stainless steel, or grade 420 stainless steel, or grade 430 stainless steel.

The second material may alternatively be a suitable non-magnetic material, such as aluminium. In a non-magnetic material inductive heating occurs solely by resistive heating due to eddy currents.

The first material is preferably selected for having a detectable Curie temperature within a desired range, for example at a specified temperature between 200° C. and 500° C. The first material may also make a contribution to heating of the heating blade, but this property is less important than its Curie temperature. Preferably the first material is a ferromagnetic metal such as nickel or a nickel alloy. Nickel has a Curie temperature of about 354° C., which may be ideal for temperature control of heating in an aerosol-generating article.

The first and second materials are in intimate contact forming a unitary heating element. Thus, when heated the first and second materials have the same temperature. The second material, which may be optimized for the heating of the aerosol generating substrate, may have a second Curie temperature, which is higher than any predefined maximum heating temperature. Once the heating element has reached the first Curie temperature, the magnetic properties of the first material change. At the first Curie temperature the first material reversibly changes from a ferromagnetic phase to a paramagnetic phase. During the inductive heating of the aerosol generating substrate this phase-change of the first material may be detected without physical contact with the first material. Detection of the phase change may allow control over the heating of the aerosol generating substrate. For example, on detection of the phase change associated with the first Curie temperature the inductive heating may be stopped automatically. Thus, an overheating of the aerosol generating substrate may be avoided, even though the second material, which is primarily responsible for the heating of the aerosol generating substrate, has no Curie temperature or a second Curie temperature, which is higher than the maximum desirable heating temperature. After the inductive heating has been stopped the heating blade cools down until it reaches a temperature lower than the first Curie temperature. At this point the first material regains its ferromagnetic properties again. This phase-change may be detected without contact with the first material and the inductive heating may then be activated again. Thus, the inductive heating of the aerosol generating substrate may be controlled by a repeated activation and deactivation of the inductive heating device. This temperature control is accomplished in a contactless manner. Besides a circuitry and electronics which is preferably already integrated in the inductive heating device there may be no need for any additional circuitry and electronics for temperature control. For example, there may be no need for a temperature sensor or any additional temperature measuring components.

Intimate contact between the first material and the second material may be made in any suitable manner. For example, the first material may be plated, deposited, coated, clad or welded onto the second material. Preferred methods include electroplating, galvanic plating and cladding. It is preferred that the first material is present as a dense layer. A dense layer has a higher magnetic permeability than a porous layer, making it easier to detect fine changes at the Curie temperature. If the second material is optimised for heating of the substrate it may be preferred that there is no greater volume of the first material than is required to provide a detectable first Curie point.

In some embodiments it may be preferred that the second material is in the form of an elongate strip having a width of between 3 mm and 6 mm and a thickness of between 10 micrometres and 200 micrometres, and that the first material is in the form of discrete patches that are plated, deposited, or welded onto the second material. For example, the second material may be an elongate strip of grade 430 stainless steel or an elongate strip of aluminium and the first material may be in the form of patches of nickel having a thickness of between 5 micrometres and 30 micrometres deposited at intervals along the elongate strip of the second material. Patches of the first material may have a width of between 0.5 mm and the thickness of the elongate strip. For example the width may be between 1 mm and 4 mm, or between 2 mm and 3 mm. Patches of the first material may have a length between 0.5 mm and about 10 mm, preferably between 1 mm and 4 mm, or between 2 mm and 3 mm.

In some embodiments it may be preferred that the second material and the first material are co-laminated in the form of an elongate strip having a width of between 3 mm and 6 mm and a thickness of between 10 micrometres and 200 micrometres. Preferably, the second material has a greater thickness than the first material. The co-lamination may be formed by any suitable means. For example, a strip of the second material may be welded or diffusion bonded to a strip of the first material. Alternatively, a layer of the first material may be deposited or plated onto a strip of the second material.

In some embodiments it may be preferred that the heating component includes an elongate heating blade having a width of between 3 mm and 6 mm and a thickness of between 10 micrometres and 200 micrometres, the heating blade comprising a core of the second material encapsulated by the first material. Thus, the heating blade may include a strip of the second material that has been coated or clad by the first material. As an example, the heating blade may include a strip of 430 grade stainless steel having a length of 12 mm, a width of 4 mm and a thickness of between 10 micrometres and 50 micrometres, for example 25 micrometres. The grade 430 stainless steel may be coated with a layer of nickel of between 5 micrometres and 15 micrometres, for example 10 micrometres. The length of an elongate heating blade is preferably between 8 mm and 15 mm, for example between 10 mm and 14 mm, for example about 12 mm or 13 mm.

The heating element may comprise an elongate strip having a width of between 3 mm and 6 mm and a thickness of between 10 micrometers and 200 micrometers. The heating element may comprise a core of the material having a Curie temperature of less than 500° C., wherein the first material is being at least in part encapsulated by the second susceptor material. Hereby is achieved that the second material alleviates the need for providing a corrosion protection on the outer surface of the first susceptor material. Corrosion protection may be necessary if nickel or a nickel alloy is used as the first susceptor material in a heating element as described above.

The heating element may be configured for dissipating energy of between 1 Watt and 8 Watt when used in conjunction with a particular inductor, for example between 1.5 Watt and 6 Watt. By configured, it is meant that the heating element may include a specific second material and may have specific dimensions that allow energy dissipation of between 1 Watt and 8 Watt when used in conjunction with a particular conductor that generates a fluctuating magnetic field of known frequency and known field strength.

The aerosol generating device may have more than one heating element, for example more than one elongate heating blade. Thus, heating may be efficiently effected in different portions of the aerosol generating substrate.

An aerosol generating system is also provided comprising an electrically-operated aerosol generating device having an inductor for producing an alternating (also referred to as a fluctuating) magnetic field, and the aerosol generating device including a heating component as described and defined herein. The consumable engages with the aerosol generating device such that the alternating magnetic field produced by the inductor induces a current and/or hysteresis losses in the heating element, causing the heating element to heat up. The electrically-operated aerosol generating device comprises electronic circuitry configured to detect the Curie transition of the first material. For example, the electronic circuitry may indirectly measure the apparent resistance (Ra) of the heating element. The apparent resistance changes in the heating blade when one of the materials undergoes a phase change associated with the Curie temperature. Ra may be indirectly measured by measuring the DC current used to produce the alternating magnetic field.

Preferably, the electronic circuitry is adapted for a closed loop control of the heating of the aerosol generating substrate. Thus, the electronic circuitry may switch off the alternating magnetic field when it detects that the temperature of the heating element has increased above the first Curie temperature. The magnetic field may be switched on again when the temperature of the heating blade has decreased below the first Curie temperature, e.g. by waiting for a predetermined time period before switching on the magnetic field again (hereby is meant switching on the alternating current to the inductive coil that produces the alternating magnetic field). Alternatively, the power duty cycle that drives the magnetic field may be reduced when the temperature of the heating blade increases above the first Curie temperature and increased when the temperature of the heating blade decreases below the first Curie temperature.

Thus, the temperature of the heating element may be maintained to be at the temperature of the first Curie temperature plus or minus 20° C. for a predetermined period of time, thereby allowing an aerosol to be formed without overheating the aerosol generating substrate. Preferably the electronic circuitry provides a feedback loop that allows the temperature of the heating element to be controlled to within plus or minus 15° C. of the first Curie temperature, preferably within plus or minus 10° C. of the first Curie temperature, preferably between plus or minus 5° C. of the first Curie temperature.

Additionally, the device may be adapted such that the first Curie temperature is used to control a cleaning cycle of the device. For example, due to multiple cycles of heating the aerosol generating substrate and removing/replacing the consumable with a new one, the heating blade may become dirty from leftover residue. Therefore, the device may be adapted to control a cleaning cycle temperature in addition to the operating temperature (e.g., heating the aerosol generating substrate). In such embodiments, feedback relating to the Currie temperature of the first material may be ignored and the heating element may be heated to reach the Currie temperature of the second material. Cleaning cycles should be performed when there is no consumable received in the cavity of the housing of the device.

The electrically-operated aerosol generating device is preferably capable of generating a fluctuating electromagnetic field having a magnetic field strength (H-field strength) of between 1 and 5 kilo amperes per metre (kA/m), preferably between 2 and 3 kA/m, for example about 2.5 kA/m. The electrically-operated aerosol generating device is preferably capable of generating a fluctuating electromagnetic field having a frequency of between 1 and 30 MHz, for example between 1 and 10 MHz, for example between 5 and 7 MHz.

A heating element may have a protective external layer, for example a protective ceramic layer or protective glass layer encapsulating the first and second materials. The heating element may include a protective coating formed by a glass, a ceramic, or an inert metal, formed over a core comprising the first and second materials. The protective layer (e.g., glass or ceramic) may help to prevent oxidation or other corrosion and may also provide for improved thermal distribution over the heating element.

In examples where the heating component is removably attachable to the device, the heating component may also include a guard. The guard may be transverse to the heating element such that the heating element extends from a first surface of the guard. The guard may abut the housing when the heating component is inserted into the housing at a second surface of the guard that is opposite the first surface. In other words, the guard may assist to control the distance that the heating blade extends from the housing. Also, the guard may block or cover any openings present on the housing so that the guard prevents or inhibits potential contamination of components disposed in the housing. For example, the guard may act as a physical barrier between the external environment and the inside of the housing from, for example, dust, solid residues of consumed sensorial media, dried residues of sensorial media vapours, etc. Additionally, the guard may be sized or shaped such that the guard is flush against the housing In some aspects, the guard may act as a thermal insulator between the heating element and the housing. In other words, the guard may help to dissipate heat produced by the heating element to reduce the amount of heat that the housing is exposed to. Specifically, this may help minimize heat exposure to the internal components of the housing. In one or more aspects, the guard may be formed in one piece with the heating element (but from another material). In other aspects, the guard may be attached to the heating element. The guard may be made out of any suitable material.

Additionally or alternatively, the electronic device may include a thermal insulator positioned between the guard of the heating component or any other suitable structure and the housing (e.g., within the cavity of the housing). The thermal insulator may provide a reduction of heat between the heating element and the housing. Further, the thermal insulator may be made of the same or a different material than the guard. For example, the thermal insulator may include porous ceramic, basalt fibbers non-woven composite, mineral-polymeric composite, etc. or combinations thereof.

The heating component may also include an engagement element extending opposite the heating blade. For example, the engagement element may extend from the second surface of the guard that is opposite the first surface of the guard from which the heating blade extends. The engagement element may be configured to be received by the receiving portion of the housing. For example, the engagement element may be the portion of the heating component that is sized and shaped to be received by the receiving portion of the housing. In other words, the engagement element of the heating component interacts with the receiving portion of the housing to provide a removably attachable relationship between the heating component and the housing.

The heating component (e.g., the engagement element) may be configured to be removably attached to the housing (e.g., the receiving portion) in any suitable way. As described herein, the heating component may be removably attached to the housing in a variety of different ways such that the heating component is at least selectively restricted from moving relative to the housing. For example, the electronic device may include a retention apparatus (of the housing) into which the heating component is inserted, the heating component may provide an interference fit with the receiving portion of the housing, the heating component may be fastened to the housing (e.g., via threads), the heating component may be latched to the housing, etc. Regardless of how the heating component is removably attachable to the housing, the electronic device may be configurable between a locked position and an unlocked position. When the heating component is inserted into or attached to the housing, the heating component may be restrained from moving relative to the housing when in the locked position and the heating component may be removable from the housing when in the unlocked position. Configuring the electronic device between a locked position and an unlocked position allows for the heating component to be secured to the housing when in the locked position and ready to be removed and replaced when in the unlocked position.

Specifically, a retention apparatus, as described herein, may include a body portion that defines the receiving portion of the housing. In other words, the heating component (e.g., the engagement element of the heating component) may be removably attachable within the body portion of the retention apparatus. The retention apparatus may be positioned proximate or near the second end of the housing to define the receiving portion. Generally, the retention apparatus may be used to describe the portion on the housing side that helps to removably attach the heating component and the housing. The retention apparatus may be described as configurable in the locked and unlocked positions to restrict and release the heating component inserted therein. The body portion of the retention apparatus may be formed of any suitable materials. For example, the body portion of the retention apparatus may include a hard polymeric compound, non-ferrous metal alloy, a multicomponent/multilayer thereof, etc. In some aspects, the body portion of the retention apparatus may also be described as a thermal insulator or heat sink between the heating component and internal components of the housing.

Specifically, in one aspect, the retention apparatus may include a pin pivotable about pivot axis positioned between a first end of the pin and a second end of the pin. The retention apparatus may also include a resilient member biased to force the first end of the pin against the heating component (e.g., the engagement element) when the heating component is received by the receiving portion of the housing. The pin and the resilient member may be formed of any suitable materials. For example, the pin may include metal alloy, hard polymeric compound, a multicomponent/multilayer thereof, etc. and the resilient member may include metal alloy, carbon fiber composite, memory material, a spring, a multicomponent/multilayer thereof, etc. The resilient member may be sized to be positioned between the pin and the body portion of the retention apparatus such that the first end of the pin is forced towards the engagement element. The retention apparatus may also include a button configurable between an engaged position and a disengaged position. The button may engage the second end of the pin to pivot the first end of the pin away from the heating component when in the engaged position such that the retention apparatus is in the unlocked position. Therefore, the heating component may be removed from the housing when the button is in the engaged position. Further, the button may disengage or detach the second end of the pin and the resilient member may pivot the first end of the pin towards the heating component when in the disengaged position such that the retention apparatus is in the locked position. In other words, when the button is not engaged, the default position of the retention apparatus is in the locked position to restrict the heating component from moving relative to the housing.

It is noted that this is one specific configuration of the retention apparatus, however, any suitable configuration for retaining the heating component in the housing is contemplated by this disclosure.

In one or more aspects, the button may extend through the housing such that the button is actuatable between the engaged and disengaged positions from an exterior of the housing. In some embodiments, the button may be biased into a disengaged position. The button may be actuated in a variety of suitable ways. For example, the button may be pressed, rotated, twisted, depressed, etc. In some aspects, the button may include a lock that prevents the button from being engaged so that any incidental pressing of the button does not result in disengagement of the heating component. Also, in one or more aspects, the engagement element may have a notch that may be configured to be engaged by the pin of the retention apparatus when in the locked position. In other words, the pin may lock into a position on the engagement element when the heating component is inserted into the housing. This notch may reinforce the locked position to help restrict movement of the heating component relative to the housing.

As described herein, the heating component may be removably attached to the housing in a variety of different ways, including the retention apparatus described above. For example, the engagement element may include threads (e.g., a threaded outer surface) such that the heating component may be configured to be secured into the receiving portion of the housing via the threads. In such embodiments, the receiving portion of the housing may include complementary threads that would interact with the threads of the engagement element. In other aspects, the engagement element of the heating component may be sized relative to the receiving portion of the housing such that the housing component is secured to the housing by interference fit. In other words, the friction between interacting surfaces of the heating component and the receiving portion of the housing may restrict some movement there-between. For example, the heating component and/or receiving portion of the housing may have a tapered section that interacts with the corresponding receiving portion and/or heating component to form an interference fit. Further, in some aspects, the heating component and/or receiving portion of the housing may include a tab, a notch, a protrusion, a recess, etc. that inhibits some movement of the heating component when inserted into the receiving portion of the housing (e.g., a smaller force maintains the connection between heating component and housing, and a greater force is needed to separate the heating component from the housing).

According to some aspects of the present invention, the electronic device may include a first portion and a second portion that are removably attachable to each other. The first portion may include the inductor and a portion of the housing having the cavity (e.g., to receive the consumable) and the second portion may include the heating component. The first portion may be positioned around the heating element when attached to the second portion and may be configured to receive the consumable in the cavity of the housing such that the heating element is inserted into the aerosol generating substrate. The first portion may provide protection to both the heating component and the consumable by surrounding each. When it is desired to remove the heating component for cleaning or replacement, the first portion may be removed from the second portion to provide easy access to the heating component.

In one or more aspects, the second portion further includes the power supply and the control electronics. The inductor may be operably coupled to the control electronics and the power supply when the first portion is attached to the second portion. In one or more aspects the first portion may include the power supply and the control electronics. The heating element may be positioned within the cavity such that the housing surrounds the heating element when the first portion is removably attached to the second portion. In one or more aspects the first portion has a first marking and the second portion has a second marking. The first and second markings may align when the first portion is removably attached to the second portion.

The first portion and the second portion may be removably attachable in any suitable way. For example, first portion may include threads and the first portion may be configured to be secured to the second portion via the threads. Also, for example, the first portion may include any other type of fastener to removably attach the first portion and the second portion. The alignment and attachment of the first portion and the second portion may help to provide a robust electrical connection between the first portion and the second portion (and the control electronics and power supply disposed therein). With respect to the inductive heating element, the corresponding inductor coils may be located in the first portion surrounding the inductive heating element and, therefore, an electrical connection may be needed between the first portion and the second portion. The mechanism for attaching the first portion and the second portion may help to control the alignment between the first and second portions. Further, in some aspects, the first portion may have a first marking and the second portion may have a second marking. The first and second markings may be aligned when the first portion is removably attached to the second portion to provide the needed electrical connection.

Furthermore, as described herein, the electronic device may include a power supply and control electronics located within the housing. One or both of the power supply and control electronics may be positioned proximate the first end of the housing.

In preferred embodiments the device may comprise a DC power source, such as a rechargeable battery, for providing a DC supply voltage and a DC current, power supply electronics comprising a DC/AC inverter for converting the DC current into an AC current for supply to the inductor. The aerosol generating device may further comprise an impedance matching network between the DC/AC inverter and the inductor to improve power transfer efficiency between the inverter and the inductor.

The power supply may be any suitable power supply, for example a DC voltage source such as a battery. In one embodiment, the power supply is a lithium-ion battery. Alternatively, the power supply may be a nickel-metal hydride battery, a nickel cadmium battery, or a lithium based battery, for example a lithium-cobalt, a lithium-iron-phosphate, lithium titanate or a lithium-polymer battery.

The device may further include a control element preferably coupled to, or comprising, a monitor or monitoring means for monitoring the DC current provided by the DC power source. The DC current may provide an indirect indication of the apparent resistance of a heating blade located in the electromagnetic field, which in turn may provide for detection of a Curie transition in the heating blade. The control element may be a simple switch. Alternatively, the control element may be electric circuitry and may comprise one or more microprocessors or microcontrollers.

The inductor may comprise one or more coils that generate a fluctuating magnetic field. The coil or coils may surround the cavity.

Preferably the device is capable of generating a fluctuating magnetic field of between 1 and 30 MHz, for example, between 2 and 10 MHz, for example between 5 and 7 MHz.

Preferably the device is capable of generating a fluctuating magnetic field having a field strength (H-field) of between 1 and 5 kA/m, for example between 2 and 3 kA/m, for example about 2.5 kA/m.

Preferably, the aerosol generating device is a portable or handheld aerosol generating device that is comfortable for a user to hold between the fingers of a single hand. The aerosol generating device may be substantially cylindrical in shape. The aerosol generating device may have a length of between approximately 70 millimetres and approximately 120 millimetres.

All scientific and technical terms used herein have meanings commonly used in the art unless otherwise specified. The definitions provided herein are to facilitate understanding of certain terms used frequently herein.

As used herein, the singular forms "a", "an", and "the" encompass embodiments having plural referents, unless the content clearly dictates otherwise.

As used herein, "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Referring now to the drawings, in which some aspects of the present invention are illustrated. It will be understood that other aspects not depicted in the drawings fall within the scope and spirit of the present invention. The drawings are schematic drawings and are not necessarily to scale. Like numbers used in the figures refer to like components, steps and the like. However, it will be understood that the use of a number to refer to a component in a given figure is not intended to limit the component in another figure labelled with the same number. In addition, the use of different numbers to refer to components in different figures is not intended to indicate that the different numbered components cannot be the same or similar to other numbered components.

DETAILED DESCRIPTION OF THE DRAWINGS

Inductive heating is a known phenomenon described by Faraday's law of induction and Ohm's law. More specifically, Faraday's law of induction states that if the magnetic induction in a conductor is changing, a changing electric field is produced in the conductor. Since this electric field is produced in a conductor, a current, known as an eddy current, will flow in the conductor according to Ohm's law. The eddy current will generate heat proportional to the current density and the conductor resistivity. A conductor which is capable of being inductively heated is known as a susceptor material. The present invention employs an inductive heating device equipped with an inductive heating source, such as, e.g., an induction coil, which is capable of generating an alternating electromagnetic field from an AC source such as an LC circuit. Heat generating eddy currents are produced in the susceptor material which is in thermal proximity to an aerosol-forming substrate which is capable of releasing volatile compounds that can form an aerosol upon heating. The primary heat transfer mechanisms from the susceptor material to the solid material are conduction, radiation and possibly convection.

Figure 1A:
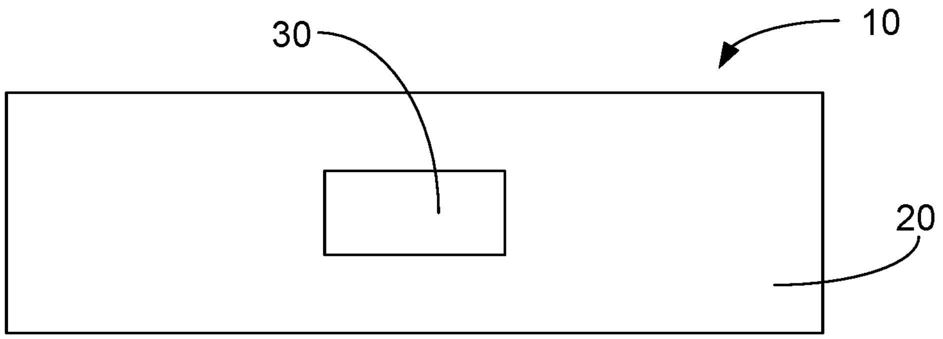
FIG. 1A is a schematic plan view of an embodiment of a heating blade for use in an aerosol generating device according to an embodiment of the invention.
Figure 1B:
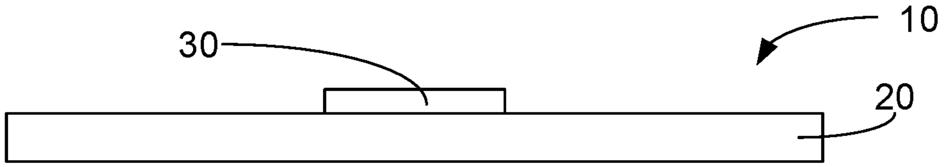
FIG. 1B is a schematic side view of the heating blade of FIG. 1A.

FIGS. 1A and 1B illustrate a specific example of a unitary multi-material heating blade adapted to be attached to an aerosol generating device and inserted into a consumable according to an embodiment of the invention. The depicted heating blade 10 is in the form of an elongate strip that may have any suitable dimensions, such as a length of 12 mm and a width of 4 mm. The heating blade is formed from a second material 20 that is intimately coupled to a first material 30. The second material 20 is in the form of a strip of suitable material, such as grade 430 stainless steel, having suitable dimensions, such as 12 mm by 4 mm by 35 micrometres. The first material 30 may be a patch of nickel of dimensions 3 mm by 2 mm by 10 micrometres. The patch of nickel has been electroplated onto the strip of stainless steel or deposited in any other suitable manner. Grade 430 stainless steel is a ferromagnetic material having a Curie temperature in excess of about 500° C. Nickel is a ferromagnetic material having a Curie temperature of about 354° C. (the exact Curie temperature of nickel will depend on the purity).

In further embodiments the material forming the first and second materials may be varied. In further embodiments there may be more than one patch of the first material located in intimate contact with the second material.

Figure 2A:
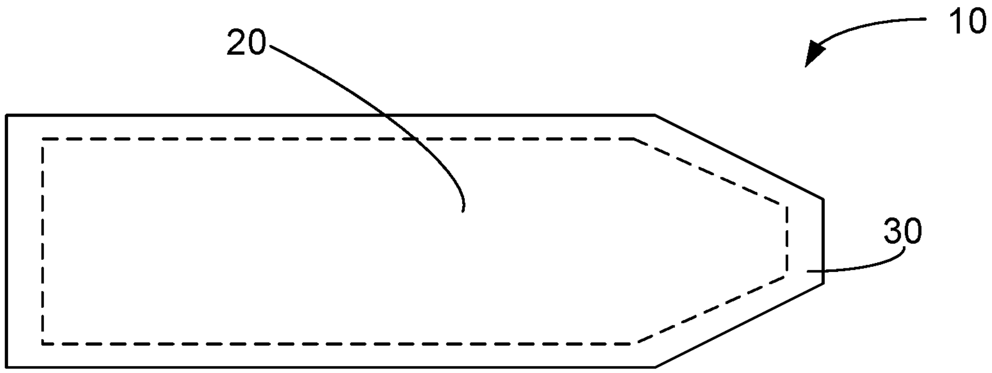
FIG. 2A is a schematic plan view of another embodiment of a heating blade for use in an aerosol generating device according to an embodiment of the invention.
Figure 2B:
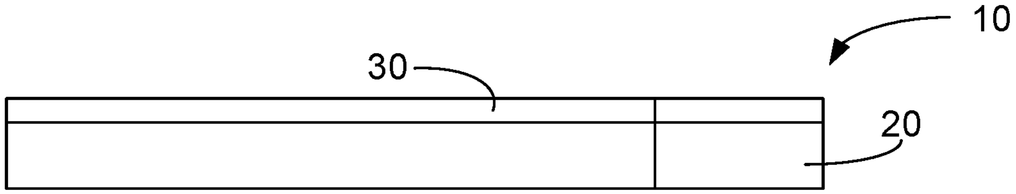
FIG. 2B is a schematic side view of the heating blade of FIG. 2A.

FIG. 2A illustrates the first material 30 completely surrounding and enclosing the second material 20. FIG. 2B illustrates a second specific example of a unitary multi-material heating blade. The heating blade 10 is in the form of an elongate strip having suitable dimensions, such as a length of 12 mm and a width of 4 mm. The heating blade 10 is formed from a second material 20 that is intimately coupled to a first material 30. The second material 20 is in the form of a strip of, for example, grade 430 stainless steel having suitable dimensions, such as 12 mm by 4 mm by 25 micrometres. The first material 30 is in the form of a strip of suitable material, such as nickel, having dimensions of, for example, 12 mm by 4 mm by 10 micrometres. The heating blade 10 is formed by cladding the strip of nickel 6 to the strip of stainless steel 5 or other suitable deposition process. The total thickness of the heating blade 10 may be, for example, 35 micrometres. The heating blade 10 of FIG. 2B may be termed a bi-layer or multilayer heating blade.

Figure 3:
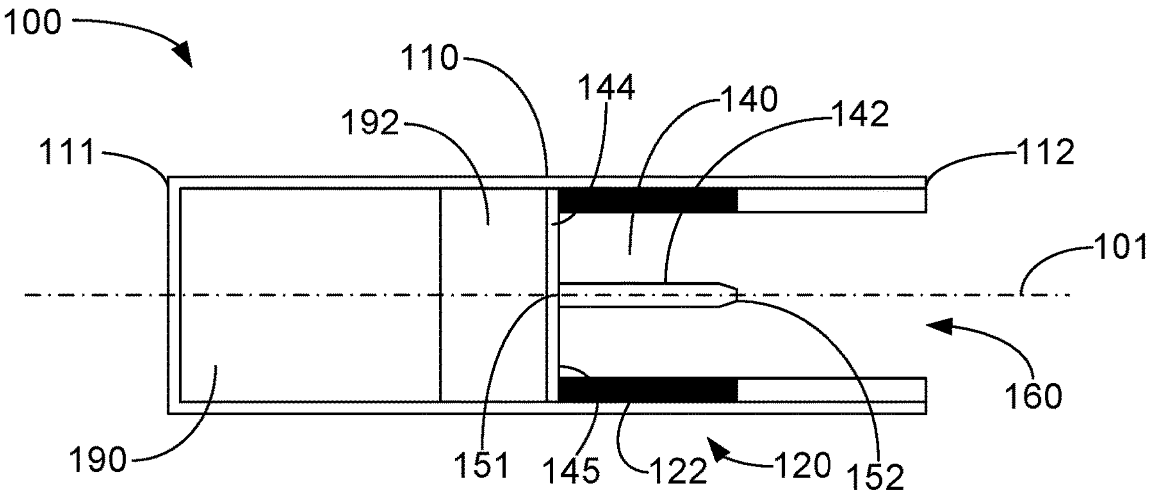
FIG. 3 is a schematic cross section of an embodiment of an electronic aerosol generating device.

An electronic device 100 including a housing 110 is shown in FIG. 3. The housing 110 extends between a first end 111 and a second end 112 along a longitudinal axis 101. The housing 110 has a cavity 160 proximate the second end 112 of the housing 110 for receiving the consumable 50.

A heating component 140 is operably attached to the housing 110 within the cavity 160. The heating component 140 includes a heating blade 142 extending along the longitudinal axis 101 within the cavity 160 and configured to be inserted into the consumable 50 (e.g., the aerosol generating substrate 52) when the consumable 50 is inserted into the cavity 160. The heating component 140 may be configured to be received by the housing 110 such that the heating component 140 may be removably attachable to the housing 110. The heating component 140 also may include a guard 144 that may be transverse (e.g., perpendicular) to the heating blade 142. In other words, the heating blade 142 may extend normal to a surface of the guard 144. For example, the heating blade 142 may extend from a first surface 145 of the guard 144.

The heating blade 142 may extend between a base end 151 proximate the guard 144 and a front end 152 away from the guard 144. The front end 152 of the heating blade 142 may have a tapered edge (e.g., as shown in FIG. 2). The tapered edge of the front end 152 of the heating blade 142 may be configured to penetrate into the consumable 50 (e.g., the aerosol generating substrate 52).

The electronic device 100 may include comprises a power supply 190 and control electronics 192 that allow the inductor 120 to be actuated. Such actuation may be manually operated or may occur automatically in response to a user drawing on a consumable 50 inserted into the cavity 160 of the electronic device 100. The power supply 190 may supply a DC current. The electronics include a DC/AC inverter for supplying the inductor with a high frequency AC current.

The electronic device 100 may also include an inductor 120 operably coupled to the power supply 190 and the control electronics 192 to produce heat in the heating component 140. The inductor 120 may include an inductor coil 122 positioned around the heating blade 142. For example, as shown in FIG. 3, the induction coil 106 may be positioned around the cavity 160. The inductor 120 may be configured to excite the heating blade 142. In use, the user inserts the consumable 50 into the cavity 160 of the housing 110 such that the aerosol generating substrate 52 of the consumable 50 is located adjacent the inductor 120.

When the device is actuated, a high-frequency alternating current is passed through coils 122 of wire that form part of the inductor 120. This causes the inductor 120 to generate a fluctuating magnetic field within a distal portion of the cavity 160 of the housing 110. The magnetic field preferably fluctuates with a frequency of between 1 and 30 MHz, preferably between 2 and 10 MHz, for example between 5 and 7 MHz. The fluctuating field generates eddy currents and/or hysteresis losses within the heating blade 142, which is heated as a result. The heated blade heats the aerosol generating substrate 52 of the consumable 50 to a sufficient temperature to form an aerosol. The aerosol is drawn downstream through the consumable 50 and inhaled by the user.

As the heating blade 142 is heated during operation its apparent resistance (Ra) increases. This increase in resistance can be remotely detected by monitoring the DC current drawn from the DC power supply 190, which at constant voltage decreases as the temperature of the heating blade 142 increases. The high frequency alternating magnetic field provided by the inductor 120 induces eddy currents in close proximity to the heating blade surface, an effect that is known as the skin effect. The resistance in the heating blade depends in part on the electrical resistivities of the first and second materials and in part on the depth of the skin layer in each material available for induced eddy currents. As the first material (e.g., Nickel) reaches its Curie temperature it loses its magnetic properties. This causes an increase in the skin layer available for eddy currents in the first material, which causes a decrease in the apparent resistance of the heating blade. The result is a temporary increase in the detected DC current when the first material reaches its Curie point.

By remote detection of the change in resistance in the heating blade 142, the moment at which the heating blade 142 reaches the first Curie temperature can be determined. At this point the heating blade 142 is at a known temperature (354° C. in the case of a Nickel susceptor). At this point the electronics in the device operate to vary the power supplied to the inductor and thereby reduce or stop the heating of the heating blade 142. The temperature of the heating blade 142 then decreases to below the Curie temperature of the first material. The power supply 190 may be increased again, or resumed, either after a period of time or after it has been detected that the first material has cooled below its Curie temperature. By use of such a feedback loop the temperature of the heating blade 142 may be maintain to be approximately that of the first Curie temperature.

Figure 4:
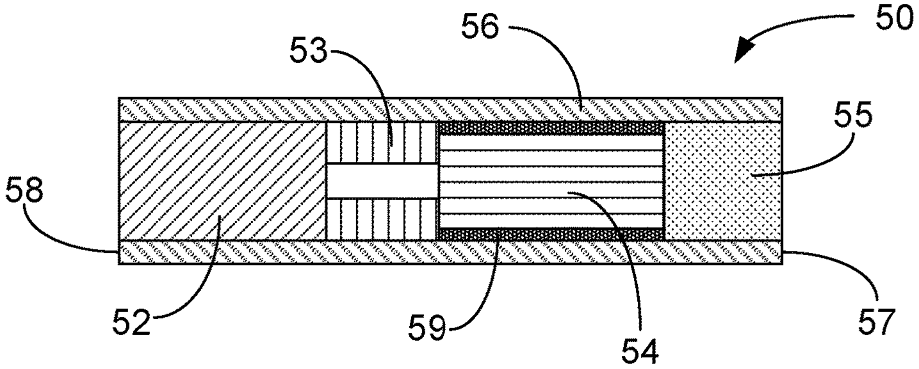
FIG. 4 is a schematic cross section of an embodiment of a consumable including an aerosol generating substrate.

FIG. 4 illustrates a consumable 50 (e.g., an aerosol-generating article) according to a preferred embodiment. The consumable 50 comprises four elements arranged in coaxial alignment: an aerosol generating substrate 52, a support element 53, an aerosol-cooling element 54, and a mouthpiece 55. Each of these four elements is a substantially cylindrical element, each having substantially the same diameter. These four elements are arranged sequentially and are circumscribed by an outer wrapper 56 to form a cylindrical rod. The heating blade 142 is adapted to penetrate into the aerosol generating substrate 52 of the consumable 50 (e.g., a distal end 58). The aerosol generating substrate 52 has a length (12 mm) that is approximately the same as the length of the heating blade 142.

The consumable 50 has a proximal or mouth end 57, which a user inserts into his or her mouth during use, and a distal end 58 located at the opposite end of the consumable 50 to the mouth end 57. Once assembled, the total length of the consumable 50 is about 45 mm and the diameter is about 7.2 mm.

In use air is drawn through the consumable 50 by a user from the distal end 58 to the mouth end 57. The distal end 58 of the consumable 50 may also be described as the upstream end of the consumable 50 and the mouth end 57 of the consumable 50 may also be described as the downstream end of the consumable 50. Elements of the consumable 50 located between the mouth end 57 and the distal end 58 can be described as being upstream of the mouth end 57 or, alternatively, downstream of the distal end 58.

The aerosol generating substrate 52 is located at the extreme distal or upstream end 58 of the consumable 50. In the embodiment illustrated in FIG. 4, the aerosol generating substrate 52 includes a gathered sheet of crimped homogenised tobacco material circumscribed by a wrapper. The crimped sheet of homogenised tobacco material comprises glycerine as an aerosol-former.

The support element 53 is located immediately downstream of the aerosol generating substrate 52 and abuts the aerosol generating substrate 52. In the embodiment shown in FIG. 4, the support element is a hollow cellulose acetate tube. The support element 53 locates the aerosol generating substrate 52 at the extreme distal end 58 of the consumable 50. The support element 53 also acts as a spacer to space the aerosol-cooling element 54 of the consumable 50 from the aerosol generating substrate 52.

The aerosol-cooling element 54 is located immediately downstream of the support element 53 and abuts the support element 53. In use, volatile substances released from the aerosol generating substrate 52 pass along the aerosol-cooling element 54 towards the mouth end 57 of the consumable 50. The volatile substances may cool within the aerosol-cooling element 54 to form an aerosol that is inhaled by the user. In the embodiment illustrated in FIG. 4, the aerosol cooling element 54 includes a crimped and gathered sheet of polylactic acid circumscribed by a wrapper 59. The crimped and gathered sheet of polylactic acid defines a plurality of longitudinal channels that extend along the length of the aerosol-cooling element 54.

The mouthpiece 55 is located immediately downstream of the aerosol-cooling element 54 and abuts the aerosol-cooling element 54. In the embodiment illustrated in FIG. 4, the mouthpiece 55 comprises a conventional cellulose acetate tow filter of low filtration efficiency.

To assemble the consumable 50, the four cylindrical elements described above are aligned and tightly wrapped within the outer wrapper 56. In the embodiment illustrated in FIG. 4, the outer wrapper is a conventional cigarette paper. The consumable 50 illustrated in FIG. 4 is designed to engage with an electrically-operated aerosol generating device comprising an induction coil, or inductor, in order to be consumed by a user.

Figure 5:
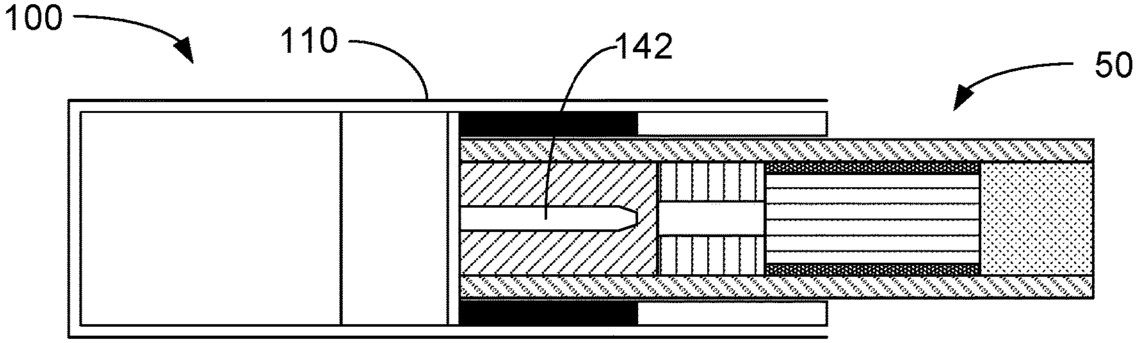
FIG. 5 is a schematic cross section of the consumable of FIG. 4 received within a cavity of the electronic device of FIG. 3.

FIG. 5 illustrates a consumable 50 received by the cavity 160 of the housing 110 and in engagement with the heating blade 142 of the electronic device 100.

Figure 6:
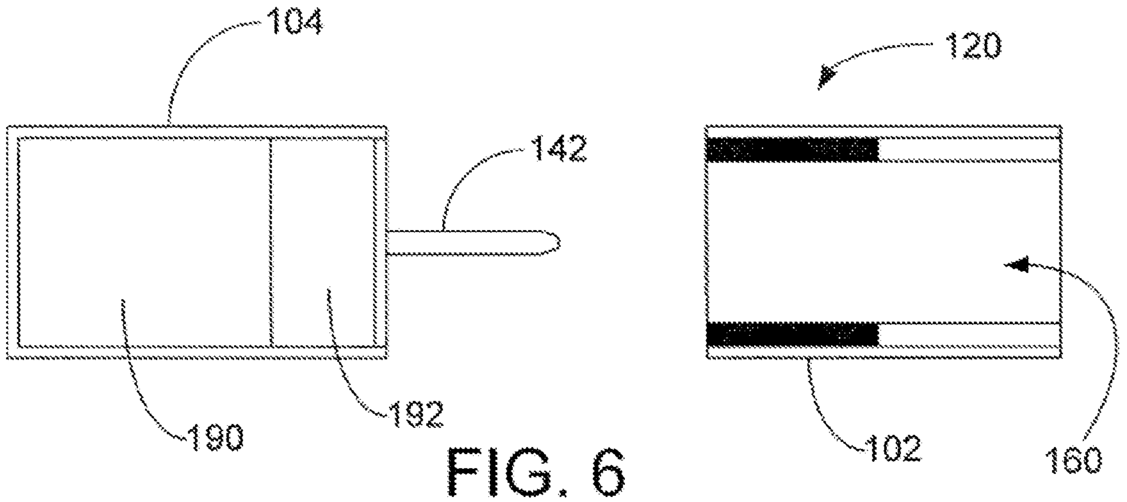
FIG. 6 is a schematic cross section of the electronic device of FIG. 3 with a first portion of the device removed from a second portion of the device.

FIG. 6 illustrates the electronic device 100 including a first portion 102 and a second portion 104 separated from one another. The first and second portions 102, 104 are removably attachable to each other. As shown in FIG. 6, the first portion 102 includes the inductor 120 and a portion of the housing 110 that has the cavity 160 and the second portion 104 includes the heating component 140 (e.g., the heating blade 142, which in other embodiments may itself be detachable—for example as one unit together with the guard 144 that may act as a holder for the heating blade 142). Further, the second portion 104 includes the power supply 190 and the control electronics 192. The inductor 120 is operably coupled to the control electronics 192 and the power supply 190 when the first portion 102 is attached to the second portion 104 (e.g., as shown in FIG. 3). Positioning the inductor coil 122 within the first portion 102 may require the power supply 190 and control electronics 192 to be operably connected to the inductor coil 122. As a result, an electrical connection may extend from the control electronics 192 and into the first portion 102 through an interface between the first and second portions 102, 104 when the first and second portions 102, 104 are attached.

Figure 7A:
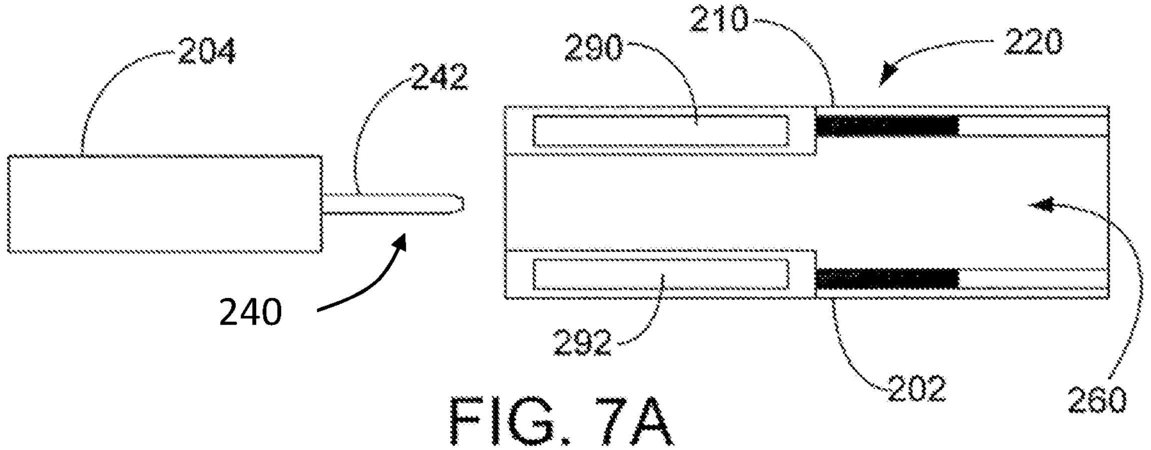
FIG. 7A is a schematic cross section of an embodiment of a first and second portion of an embodiment of an electronic aerosol generating device separated from one another.
Figure 7B:
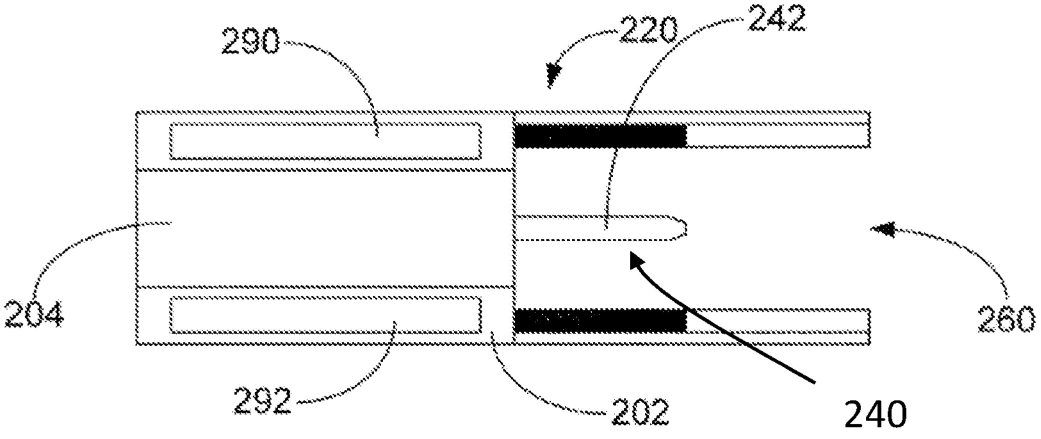
FIG. 7B is a schematic cross section of the first and second portions of the electronic device of FIG. 7A attached to one another.

FIG. 7A illustrates another arrangement of first and second portions 202, 204 of an electronic device 200 separated from one another. For example, the first portion 202 may include an inductor 220, a portion of the housing 210 that has the cavity 260, a power supply 290, and control electronics 292. The second portion 204 may include a heating component 240 (e.g., a heating blade 242). When the second portion 204 is attached to the first portion 202 (e.g., as shown in FIG. 7B), the heating blade 242 is positioned such that the inductor 220 excites the heating blade 242. In the embodiment shown in FIGS. 7A and 7B, the first and second portions 202, 204 are only physically attached to one another and do not require an electrical connection. For example, the power supply 290, the control electronics 292, and the inductor 220 are all included within the first portion 202 and, therefore, are electrically coupled to one another regardless of whether or not the first portion 202 is attached to the second portion 204. As a result, the user is less restricted in attaching the first portion 202 to the second portion 204 because no electrical connection between the first and second portions 202, 204 is required.

The various features described through FIGS. 1-7B may be used in combination with any other feature described in FIGS. 1-7B, so long as they are not inconsistent with one another.

Thus, methods, systems, devices, compounds and compositions for HEATING COMPONENT IN AEROSOL GENERATING DEVICES are described. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in electronic device manufacturing or related fields are intended to be within the scope of the following claims.

The invention claimed is:

1. An electronic device for receiving a consumable comprising an aerosol generating substrate, the electronic device comprising:

a housing extending between a first end and a second end along a longitudinal axis, wherein the housing comprises:

a cavity configured to receive the consumable; and a recess configured to releasably receive a heating component comprising a heating element having a material with a Curie temperature of less than 500° C.;

an inductor comprising an inductor coil that is configured to generate eddy currents and/or hysteresis losses in the heating element when the heating component is received in the housing;

a power supply operably connected to the inductor; and control electronics connected to the power supply and configured to detect a phase change in the material of the heating element as the material is heated or cooled around the Curie temperature of the material the Curie temperature.

2. The electronic device of claim 1, further comprising the heating component comprising the heating element received in the housing.

3. The electronic device of claim 2 wherein the control electronics are connected to the inductor and are configured to control heating of the heating element via the inductor.

4. The electronic device according to claim 2, wherein the heating element further comprises a protective layer covering the outer surface of the material.

5. The electronic device according to claim 1, wherein the control electronics are configured to switch off, or limit the power supply to the inductor upon detection of the phase change in the material of the heating element when the temperature of the material is heated around the Curie temperature, and to switch on, or increase, the power supply to the inductor upon detection of the phase change in the material of the heating element when the temperature of the material is cooled around the Curie temperature.

6. The electronic device according to claim 1, wherein the material having the Curie temperature of less than 500° C. is selected from the group consisting of nickel alloy and nickel.

7. The electronic device according to claim 1, wherein the heating element further comprises a second susceptor material positioned in thermal contact with the material having a Curie temperature of less than 500° C.

8. The electronic device according to claim 7, wherein the second susceptor material is selected from the group consisting of aluminum, iron, iron alloy, and stainless steel.

9. A device according to claim 7, wherein the material having the Curie temperature of less than 500° C. and the second susceptor material are co-laminated and comprise an elongate strip having a width of between 3 mm and 6 mm and a thickness of between 10 micrometers and 200 micrometers, where the second susceptor material has a greater thickness than the material having the Curie temperature of less than 500° C.

10. A device according to claim 7, wherein the heating element comprises an elongate strip having a width of between 3 mm and 6 mm and a thickness of between 10 micrometers and 200 micrometers, wherein the heating element comprises a core of the material having the Curie temperature of less than 500° C. being at least in part encapsulated by the second susceptor material.

11. A device according to claim 1, wherein the material is adapted to control the temperature of the heating element without use of a temperature sensor.

12. A device according to claim 2 wherein the heating element has a front end configured to penetrate into the consumable comprising an aerosol generating substrate.

13. A device according to claim 12 wherein the front end of the heating element comprises a tapered edge.

14. A device according to claim 1 wherein the aerosol generating substrate comprises solid, liquid or gel.

15. A device according to claim 14 wherein the aerosol generating substrate comprises nicotine.

16. A device according to claim 2 wherein the heating component comprises a guard transverse to the heating element.

17. A device according to claim 16 wherein the guard is between the heating element of the heating component and the housing.

18. A device according to claim 17 further comprising a thermal insulator positioned between the guard of the heating component and the housing.

* * * * *